United States Patent [19]

Bailey

[11] 4,355,949
[45] Oct. 26, 1982

[54] CONTROL SYSTEM AND NOZZLE FOR IMPULSE TURBINES

[75] Inventor: John M. Bailey, Dunlap, Ill.

[73] Assignee: Caterpillar Tractor Co., Peoria, Ill.

[21] Appl. No.: 149,352

[22] PCT Filed: Feb. 4, 1980

[86] PCT No.: PCT/US80/00116
§ 371 Date: Feb. 4, 1980
§ 102(e) Date: Feb. 4, 1980

[51] Int. Cl.³ .............................................. F01D 17/06
[52] U.S. Cl. ..................................... 415/35; 415/202; 239/461
[58] Field of Search .................. 415/35, 202; 239/433, 239/461, 543, 589

[56] References Cited

U.S. PATENT DOCUMENTS

| | | | |
|---|---|---|---|
| 580,098 | 4/1897 | Williams | 415/36 |
| 929,198 | 7/1909 | Doble et al. | 415/35 |
| 1,017,438 | 2/1912 | McAuley | 415/36 |
| 1,035,082 | 8/1912 | Cachin | 415/36 |
| 2,889,117 | 6/1959 | Wimpress | 415/35 |
| 3,168,079 | 2/1965 | Henderson | 123/263 |
| 3,668,869 | 6/1972 | De Corso et al. | 60/740 |

*Primary Examiner*—Louis J. Casaregola
*Attorney, Agent, or Firm*—Sixbey, Friedman & Leedom

[57] ABSTRACT

An impulse turbine system (10) includes a rotatably mounted turbine wheel (12) and a speed sensing system (40) to sense the speed of the turbine wheel (12). A flow diversion nozzle (14) normally provides a jet of driving fluid to power the turbine wheel (12). This nozzle (14) includes an internal flow diverter (30, 38, 58, 74, 76, 88, 90, 94, 104, 110, 118) which operates under the control of the speed sensing system (40) when the turbine wheel (12) reaches an overspeed condition to angularly divert the jet of driving fluid issuing from the nozzle opening (26).

11 Claims, 14 Drawing Figures

CONTROL SYSTEM AND NOZZLE FOR IMPULSE TURBINES

DESCRIPTION

1. Technical Field

The present invention relates generally to speed control systems for impulse turbines and more particularly to the nozzle structure used to provide a fluid drive jet for such turbines.

2. Background Art

Impulse turbines may often be effectively employed to drive power generators, particularly in regions where natural supplies of flowing water exist. There are a great many streams throughout the United States which have rather low water flow but have rather large fall (heads to say 200 ft), and these are well suited to drive impulse power turbines of the Pelton type. The basic impulse turbines are quite small and relatively inexpensive per horsepower produced. However, if it is desired to operate the turbines at a desired constant speed as required for the production of AC current, the governing system becomes quite expensive. This is because considerable work is required to vary the nozzle area or deflect the drive fluid jet, and a hydro-mechanical power assisted governor is required which may cost as much as the turbine and generator combined. Consequently, many small impulse turbine units are used only to produce DC current for which close speed control is not required.

Many speed control systems for turbines and water wheels known to the prior art employ mechanical governors in combination with complex mechanical deflection units to deflect the flow of fluid from a nozzle to the turbine wheel when an overspeed condition occurs. These mechanical deflection units, such as the ones shown in U.S. Pat. Nos. 580,098 to H. D. Williams, 929,198 to R. McF. Doble et al, 1,017,438 to T. McAuley, and 1,035,082 to J. Cachin physically intersect and divert a fluid jet, thereby requiring the use of considerable force for effective operation.

The use of fluid powered amplifiers and switches has been employed in arts other than the turbine art to divert a fluid stream using only a low volume control force. Such a system is illustrated in U.S. Pat. No. 3,168,079 to R. D. Henderson. It is apparent that the use of a low volume control force to deflect the fluid jet of an impulse turbine would be advantageous and an advance in the turbine art.

DISCLOSURE OF INVENTION

One aspect, of the present invention is to provide a novel fluid impulse turbine system wherein a diverter operative in response to a very low control force effectively diverts a jet of power fluid away from a turbine wheel to control an overspeed condition.

Another aspect of the present invention is to provide a novel fluid directing nozzle having a jet forming neck portion and diverging section.

The foregoing and other aspects of the invention will become apparent from the following description when considered in conjunction with the accompanying drawings.

The present invention is directed to overcoming one or more problems related to the above-mentioned known prior art.

BEST MODE FOR CARRYING OUT THE INVENTION

Figures 1, 2:
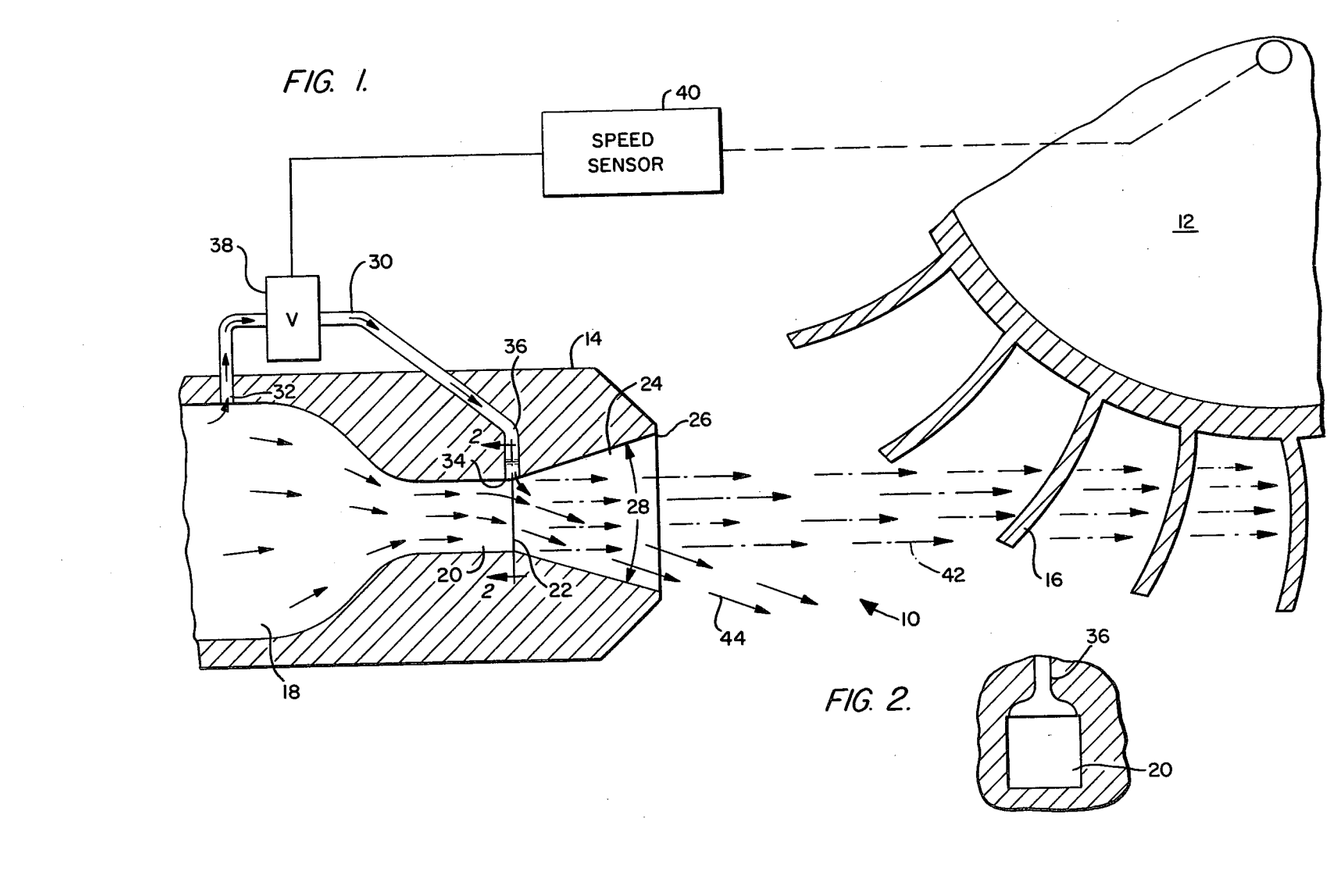
FIG. 1 is a diagrammatic view of the fluid impulse turbine system of the present invention showing a vertical, longitudinal sectional view of the fluid nozzle.
FIG. 2 is a sectional view taken along lines 2—2 of FIG. 1.

Referring now to FIGS. 1 and 2, an impulse turbine indicated generally at 10 includes a turbine or bucket wheel 12 and a nozzle 14 through which water is supplied to the turbine wheel. The turbine wheel 12 rotates on a central shaft and includes a plurality of peripherally mounted cup shaped buckets 16 of the type conventionally used in Pelton water-wheels. These buckets receive the driving fluid from the nozzle 14 which is used to drive the turbine wheel 12. The central axis of the nozzle is aligned to extend through the surface of the buckets at the periphery of the turbine wheel, so that normally a jet of fluid from the nozzle impinges directly on the buckets 16 as they rotate into the fluid stream.

The nozzle 14 is connected to a fluid source and receives fluid through high pressure flow passage 18 which, at the nozzle end, tapers inwardly to form a rectangular shaped neck 20 of reduced cross-section. This neck, which shapes the high pressure in passage 18 to a fluid jet issuing from the nozzle, terminates at a point 22 where the nozzle tapers outwardly to form a diverging section 24. The diverging section terminates at a nozzle opening 26 which is much wider than the cross section of the neck 20. The angle 28 formed by the outwardly tapering walls of the diverging section 24 is important, and ideally constitutes an angle of close to 30°. This angle should normally be within the range of from 20°–40°.

A small fluid bypass line 30 is provided having an inlet port 32 which communicates with the flow passage 18 at a point before the flow passage tapers inwardly to form the rectangular shaped neck 20. This bypass line extends between the inlet port and an outlet port 34 which is positioned at the point 22 where the neck 20 terminates and the outwardly tapered diverging section 24 begins. It should be noted that the bypass line 30 includes an outlet line section 36 which terminates at the outlet port 34 and which has a central axis that is oriented transversely to the central axis of the rectangular neck section 20.

The flow of fluid through the bypass line 30 from the flow passage 18 is controlled by a valve 38 in the bypass line. This valve may be an electrically or mechanically actuated valve which is controlled by a speed sensing device 40 responsive to the speed of the turbine wheel 12. Any speed sensing means known to the art capable of mechanically or electrically controlling the valve 38 may be employed. For example, a conventional fly-weight governor could be used to directly actuate the valve. On the other hand, if the valve 38 is an electrically operated valve, such as a solenoid valve, the speed sensing device 40 will constitute a means for effecting an electrical signal as a function of turbine speed. This can be a centrifugal switch which closes at a predetermined speed to provide power to the valve 38, or an oscillator, alternator, or similar frequency or voltage generating device which is driven by the turbine wheel and coupled to a frequency or voltage sensor to provide power to the valve when the received frequency or voltage exceeds a predetermined level.

Normally, fluid flows through the rectangular shaped neck 20 and out through the diverging section 24 along a flow path 42 to contact the buckets 16 of the turbine wheel 12. However, if the speed of the turbine wheel exceeds a desired speed, the speed sensing and controlling device 40 opens the valve 38, causing a small flow of fluid to pass through the fluid bypass line 30 and out through the outlet port 34 in a direction transverse to the flow path 42. This jet of fluid from the outlet port 34 causes the flow through the diverging section 24 to be diverted to an alternate flow path 44 wherein the fluid issuing from the nozzle opening 26 fails to contact the buckets 16 of the turbine wheel 12. This essentially eliminates all torque application to the turbine wheel which immediately begins to slow down. When the speed of the turbine wheel drops to or below the desired speed, the speed sensing device 40 closes the valve 38, and the fluid from the nozzle opening 26 once again strikes the buckets 16 to drive the turbine wheel.

Since the diverting fluid flow through the outlet 34 may be switched on and off very rapidly with no shock, the system of FIG. 1 will reliably maintain turbine wheel speed very close to a desired speed. However, as illustrated in FIG. 1, the fluidic switching structure is of a conventional two dimensional type, where all functions occur in a two dimensional plane. This requires that a rectangular flow passage of the type shown by the neck 20 be employed, and such flow passages are not ideally suited for use with the usual Pelton type impulse turbine which is best driven by jets of circular cross-section. Consequently, it is more desirable to employ a fluidic switching system that will effectively divert a circular jet, and this requires a form of three dimensional fluidic switch.

Figures 3, 4, 5:
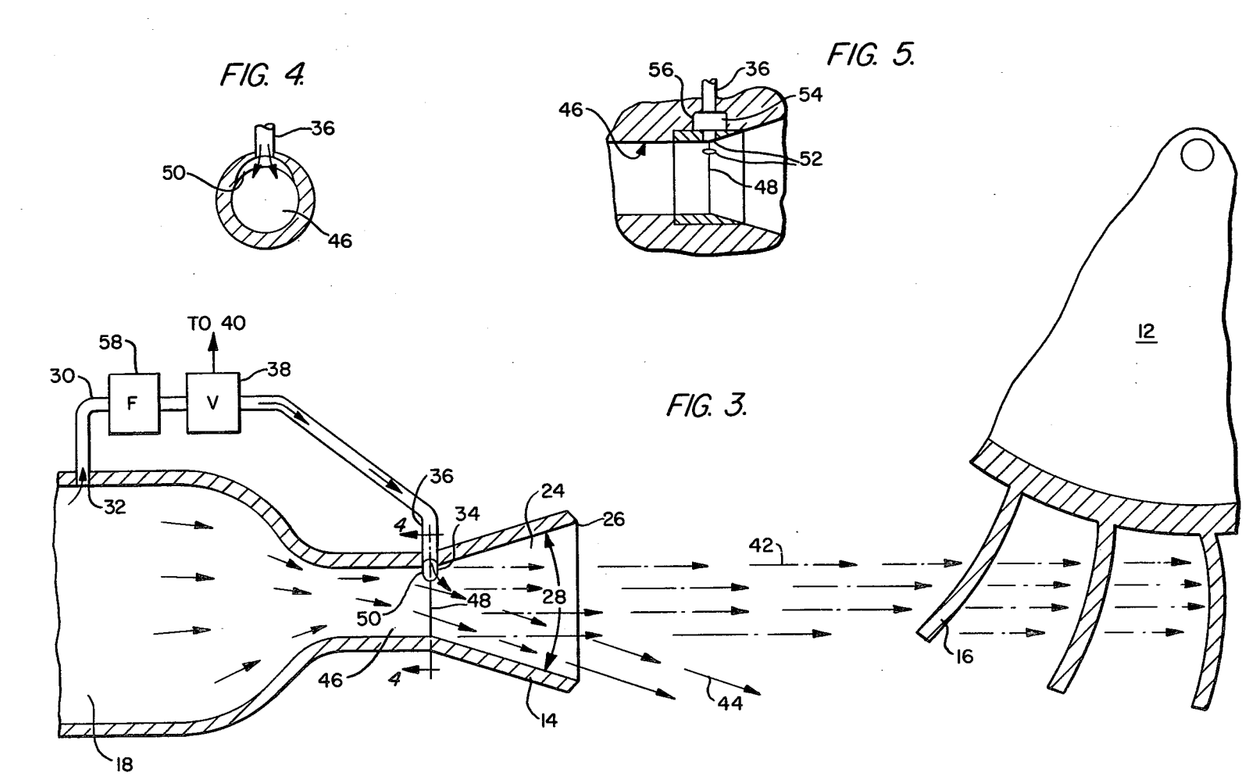
FIG. 3 is a diagrammatic view of a second embodiment of the fluid impulse turbine system of the present invention showing a vertical, longitudinal sectional view of the fluid nozzle.
FIG. 4 is a sectional view taken along lines 4—4 of FIG. 3.
FIG. 5 is a vertical, longitudinal sectional view of a second embodiment of the nozzle of FIG. 3.

FIGS. 3, 4, and 5 illustrate a quasi three dimensional flow diverting nozzle which is readily adaptable for use with the circular flow of a Pelton type impulse turbine. Here, fluid flowing through the flow passage 18 of a Pelton type nozzle 14 passes into a circular shaped neck 46 of reduced cross-section. This circular shape neck terminates at a circular line 48 where the walls of the nozzle 14 taper outwardly to form the diverging section 24. Again, the walls of the diverging section preferably taper to form an angle of 30° or an angle within the range of from 20°–40°.

The bypass line 30 begins at the inlet port 32, but instead of terminating at an oulet port 34 as shown in FIG. 1, the bypass line of FIG. 3 terminates in an arcuate shaped slot 50 which extends along the line 48. Thus the arcuate slot, like the outlet port 34, is located on or near the transition between the circular neck 46 and the conically shaped diverging section 24.

FIG. 5 illustrates another embodiment of the flow diverting nozzle of FIG. 3 wherein the outlet slot 50 is replaced by a plurality of outlet apertures 52 extending along an arc positioned on the line 48 as shown in FIG. 5. Fluid from the outlet section 36 of the bypass line is provided to a chamber 54 formed in a collar 56 which extends around the end of the circular shaped neck 46. The chamber 54 is positioned over the outlet apertures 52 and supplies fluid from the bypass line 30 which flows through the apertures 52 to provide diverting jets transverse to the central axis of the circular shaped neck 46.

The structures of FIGS. 3, 4 and 5 operate substantially in the same manner as described in connection with the structure of FIGS. 1 and 2, with the exception that a circular jet of fluid from the nozzle 14 is effectively diverted thereby. It will be noted in FIG. 3 that a filter 58 is provided in the bypass line 34 before the valve 38 to prevent any foreign matter from clogging the valve, the bypass line, or the outlet slot 50.

Diversion of the circular jet of driving fluid for a Pelton type impulse turbine need not always be accomplished by a control fluid stream directed transversely to the flow direction of the driving fluid. In the nozzle structure illustrated in FIG. 6, the actual driving fluid through the circular shaped neck 46 is selectively employed to create a conical fluid flow through the nozzle opening 26 which reduces the driving power applied to the turbine wheel 12. To accomplish this operation, tube 58 is mounted so that an open end 60 of the tube is located at or very near the transition line 48 between circular shaped neck 46 and the conical diverging section 24. Ideally, the tube is mounted so that the central axis thereof extends along the central axis of the circular shaped neck 46. The remaining, outermost end of the tube is closed at 62 to prevent fluid flow therethrough.

Figure 6:
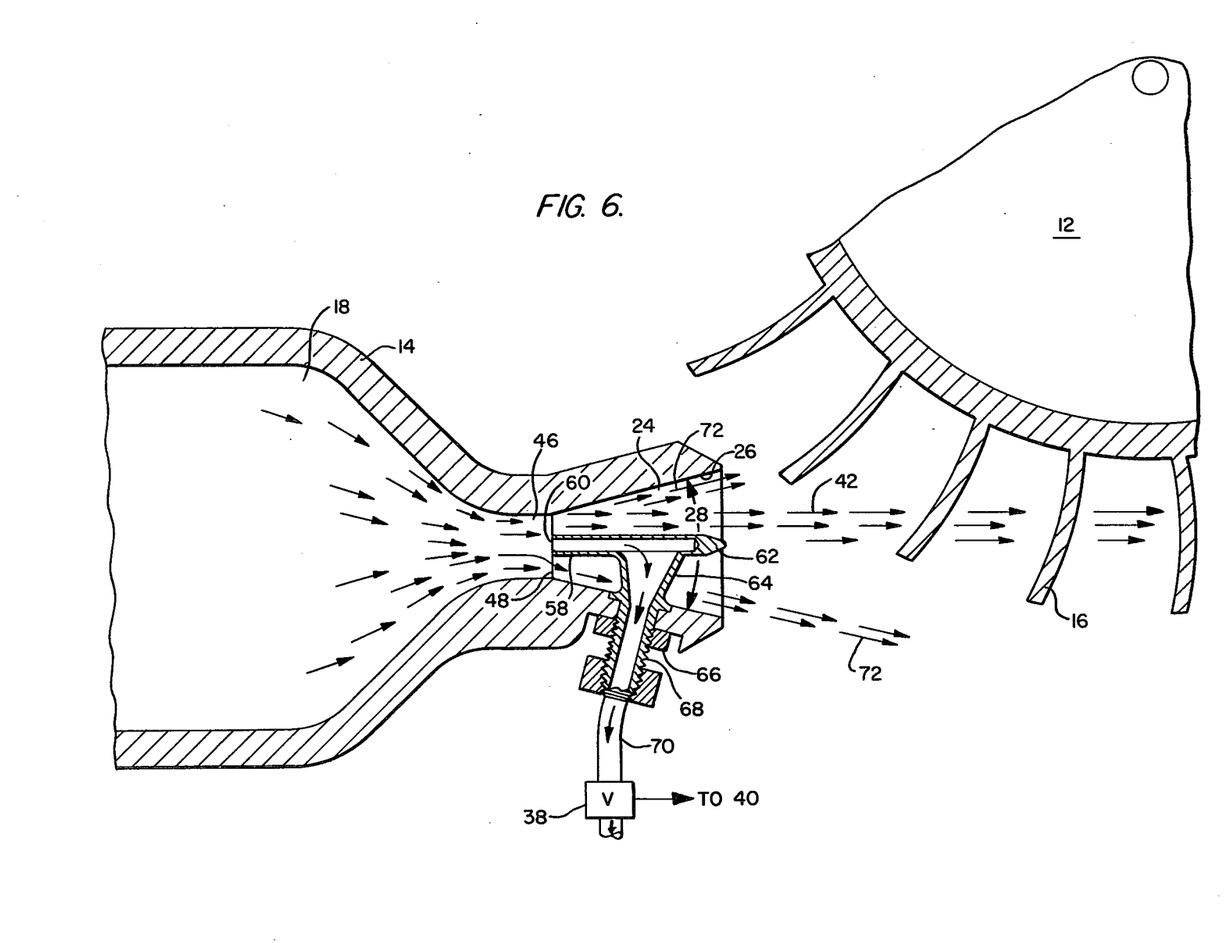
FIG. 6 is a vertical, longitudinal sectional view of a third embodiment of the fluid impulse turbine system of the present invention.

The tube 58 is mounted in position by a very thin, hollow, streamlined strut 64 which is secured to the wall of the diverging section 24 by a threaded nut 66, or other suitable mounting means. The portion of the strut which extends outwardly from the diffuser section wall is tubular in configuration as illustrated at 68, and is connected to a fluid exit line 70 which conducts fluid to a suitable receiver. The valve 38, which is controlled in response to the speed of the turbine wheel 12, is connected to control fluid flow through the fluid exit line 70, and normally this valve is open to permit fluid flow.

In the operation of the impulse turbine system of FIG. 6, when the turbine wheel 12 is turning at the desired speed, a circular jet of fluid flows from the circular shaped neck 46 of the nozzle 14 through the diverging section 24 and out through the nozzle opening 26 to contact the cup shaped buckets 16 and drive the turbine wheel. Fluid which impinges against the open end of the tube 58 is permitted to pass in through the tube, through the strut 64 and the tubular portion 68 of the strut, and out through the fluid exit line 70 and the open valve 38. Very little disruption of the drive jet is caused by the streamlined strut 64, and substantially no fluid disturbance occurs at the open end 60 of the tube 58, since fluid is permitted to pass freely into the tube.

Once the turbine wheel 12 exceeds the desired speed, the speed sensing device 40 closes the valve 38, and fluid now fills or discontinues flowing through the tube 58. The previously open end of the tube now acts in the same manner as would a solid pin, and causes the flow of fluid through the diverging section 24 to leave the normal flow path 42 and fan outwardly in a conical shaped flow against the walls of the diverging section. This alternate conical path, indicated at 72, causes a large portion of the flow exiting from the nozzle opening 26 to completely miss the cup shaped buckets 16 of the turbine wheel 12. That portion of the outgoing flow which does contact the cup shaped buckets does so at an angle different from the normal drive angle and is therefore inefficient for driving purposes. Consequently, the driving power to the turbine wheel 12 is decreased until the speed of the wheel drops to a point equal to or below the desired speed, at which time the speed sensing device 40 reopens the valve 38.

During the normal operation of the nozzle 14 of FIG. 6, the flow of fluid through the tube 58 causes some decrease in the fluid power available to drive the turbine wheel 12. Also, some additional loss in driving power is caused by the fluid disturbance around the strut 64. These losses can be alleviated by employing the nozzle structure 14 of FIG. 7 wherein a tube 74, which is now closed at both ends, is mounted upon a hollow streamlined strut 76. The strut 76 is secured to the wall of the flow passage 18 and positions the tube so that the central axis thereof preferably lies along the common central axis of the flow passage 18 and the circular shaped neck 46. An inner closed end of the tube 78 is positioned within the flow passage 18 while the outermost closed end 80 of the tube is positioned within the diverging section 24. This outermost closed end is of tapered, conical configuration and terminates at a pointed apex 82 positioned along the central axis of the circular neck 46 and extending toward the nozzle opening 26. This tapered closed end creates a good solid jet of fluid around the outermost end of the tube during normal flow operation of the nozzle 14.

Figures 7, 8, 9:
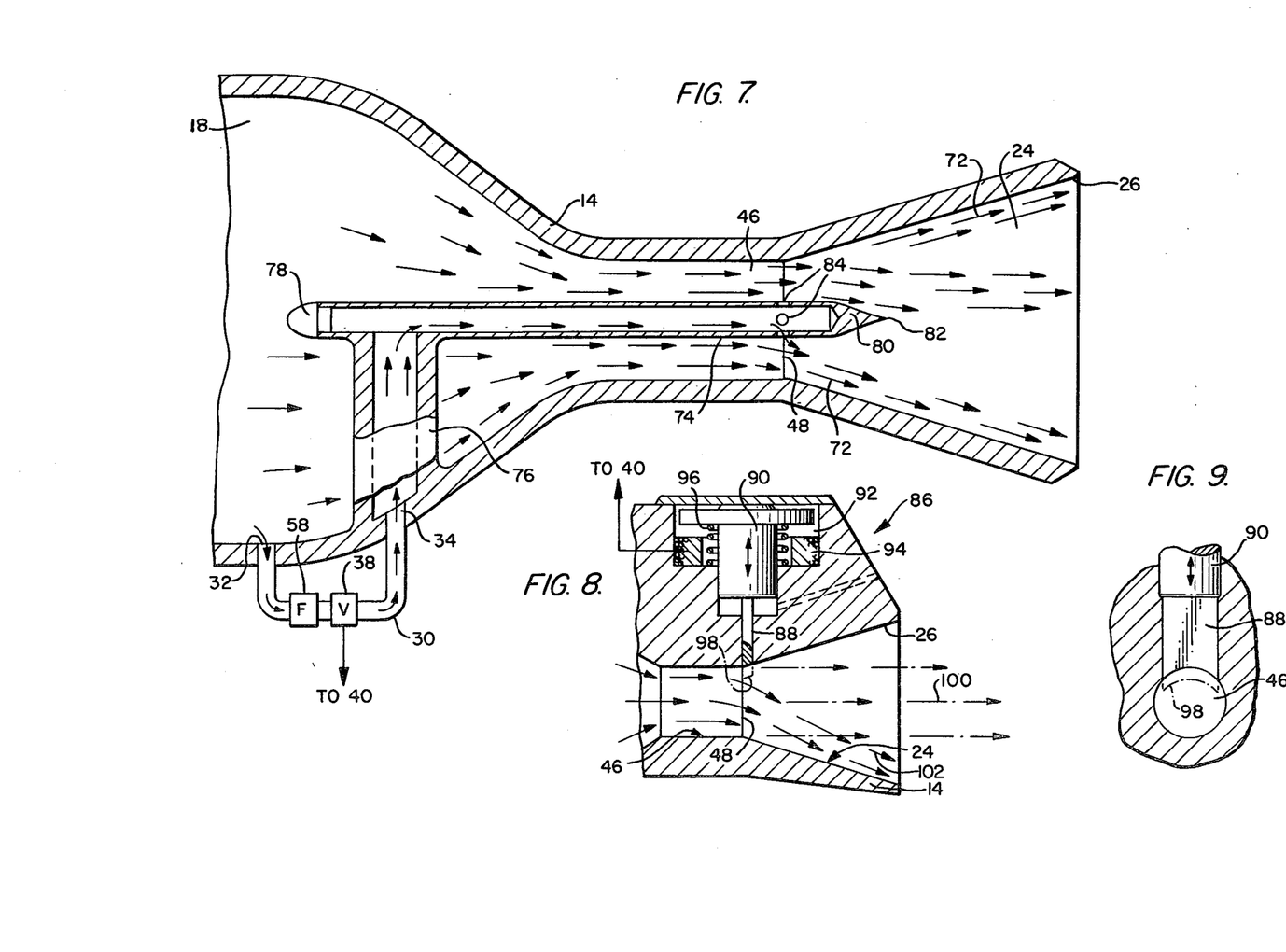
FIG. 7 is a vertical, longitudinal sectional view of a second embodiment of a nozzle of the present invention.
FIG. 8 is a vertical, longitudinal sectional view of a portion of a third embodiment of a nozzle of the present invention.
FIG. 9 is a sectional view of a portion of the nozzle of FIG. 8.

The tube 74 is provided with a plurality of radial holes 84 located substantially in line with the juncture 48 between the neck 46 and the diverging section 24. The bypass line 30 is connected between the flow passage 18 and the hollow strut 76, so that when the valve 38 is opened by the speed sensing device 40 upon the occurrence of an overspeed condition of the turbine wheel 12, fluid is provided from the outlet 34, the strut 76 and the tube 74 to the radial holes 84. Fluid jets pass outwardly from the radial holes to drive the fluid stream from the neck 46 outwardly against the walls of the diverging section. The resultant conical fluid stream 72 reduces the driving power for the turbine wheel in the manner previously described.

The nozzle structure of FIG. 7 controls the fluid jet from the nozzle opening 26 with substantially no loss of power fluid and minimal disruption of the jet. This is due to the fact that the strut 76 is positioned in the flow passage 18 where the fluid flow is low in velocity compared to flow in the neck 46 and the diverging section 24. The smaller area of the neck causes the velocity of the fluid passing therethrough to increase substantially.

The normal power fluid stream from the nozzle 14 may be diverted mechanically to alleviate a turbine wheel overspeed condition, although fluid from the flow passage 18 may be employed to power a mechanical flow diverting structure. A simple, mechanical flow diverting unit is illustrated at 86 in FIG. 8. Here, a sliding plate 88 is connected to a solenoid core 90 which is positioned within a chamber 92 formed in the nozzle housing. A solenoid coil 94 is electrically connected to the speed sensing device 40, and is energized thereby when the turbine wheel 12 exceeds a predetermined speed.

A spring 96 normally biases the solenoid core 90 away from the coil 94, and serves to position the plate 88 so that the end thereof is flush with the inside dimension of the circular neck 46 and the diverging section 24. It will be noted from the side view of FIG. 8 that the end 98 of the plate is angled upwardly to conform with the angle of the walls of the diverging section, while in FIG. 9, a consideration of the front view of the plate shows that the end 98 thereof is concave in configuration to conform with the outer circumference of the neck 46. Thus, when the plate is positioned so that the rear surface thereof is on the juncture 48 between the neck 46 and diverging section 24, and the solenoid coil 94 is deenergized, the end 98 of the plate will cause no disruption in fluid flow through the nozzle 14. However, when an overspeed condition occurs, the solenoid coil 94 is energized from the speed sensing device 40, and the end 98 of the plate now projects into the fluid stream at the juncture 48. This deflects the fluid jet from a normal flow path 100 to a flow path 102 along the bottom wall of the diverging section 24. The deflected flow path causes substantially all of the fluid issuing from the nozzle opening 26 to miss the buckets 16 of the turbine wheel 12.

Figure 10:
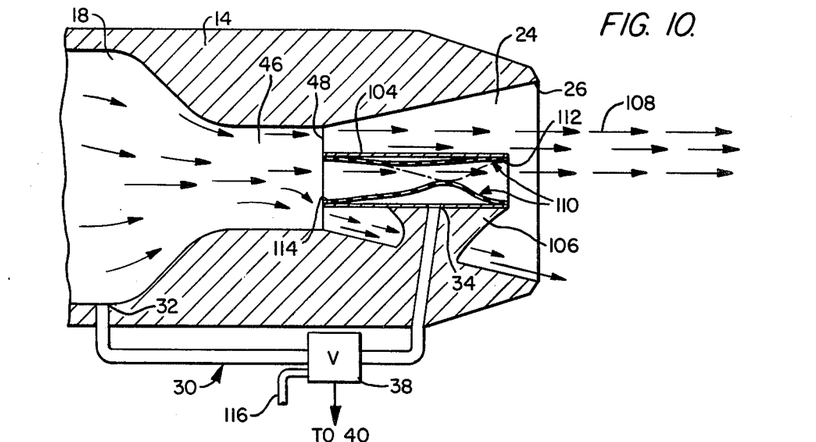
FIG. 10 is a vertical, longitudinal sectional view of a fourth embodiment of a nozzle of the present invention.

In the nozzle 14 of FIG. 10, fluid from the flow passage 18 is employed to power the mechanical flow diverter structure within the nozzle. In this embodiment of the invention, an open ended tube 104 is mounted within the diverging section 24 by a streamlined strut 106 secured to the wall of the diverter section. The central axis of the tube 104 lies along the common central axis of the neck 46 and the diverging section 24, and during the normal operation of the nozzle, fluid passes both through and around the tube with little disruption of the power fluid jet 108. It will be noted that the tube 104 is positioned so that the inner end thereof is aligned with the juncture 48 between the neck 46 and the diverging section 24.

A second tubular structure 110 of rubber or similar resilient material is inserted within the tube 104, and the ends of this internal tube are sealed at 112 and 114 to the tube 104. When the turbine wheel 12 exceeds a desired speed, the speed sensing device 40 activates the valve 38 to permit fluid to enter the fluid bypass line 30 from the flow passage 18. Fluid now passes through the valve 38 which is intended to also boost the hydraulic pressure to some value above that within passage 18 and the outlet port 34 which is positioned to admit fluid between the tube 104 and the resilient inner tube 110. This results in expansion of the resilient inner tube away from the wall of the tube 104 until this tube is substantially closed to fluid flow. A stagnation zone is now created at the entrant end to the tube 104, and the power fluid flow is diverted outwardly to follow a conically shaped flow path 112 along the walls of the diverging section 24. This conical flow reduces the power to the turbine wheel 12 in the manner previously described.

It should be noted that the valve 38 in FIG. 10 is a three way valve having a drain line 116. Thus, when the valve permits flow between the inlet port 32 and the outlet port 34, the drain line 116 is closed. However, when the valve closes to block fluid flow between the inlet and outlet ports, the drain line is connected to the outlet port 34 so that fluid may be drained from the space between the resilient tube 110 and the tube 104.

Figure 11:
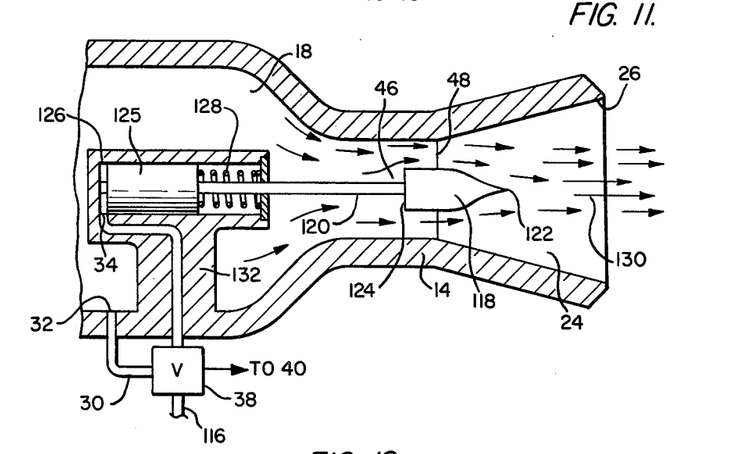
FIG. 11 is a vertical, longitudinal sectional view of a fifth embodiment of a nozzle of the present invention.
Figure 12:
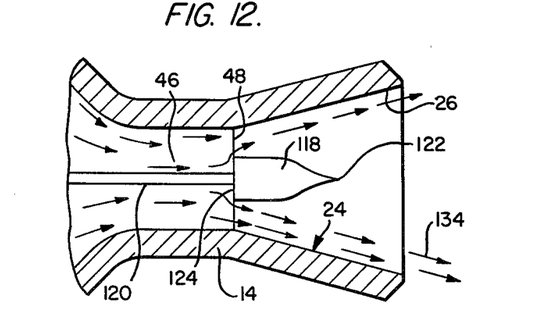
FIG. 12 is a vertical, longitudinal sectional view of a portion of the nozzle of FIG. 11 in the power off mode.

Referring now to FIGS. 11 and 12, an effective mechanical flow diverter for the nozzle 14 is illustrated which is powered by fluid from the flow passage 18. This unit includes a probe 118 which is mounted at end of the piston shaft 120 for axial movement to effect control of the drive fluid jet from the nozzle opening 26. The forward end of the probe is conically tapered to a terminal apex 122 which lies along the central axis of the neck 46 and the diverging section 24. The rear end of the probe is formed to provide a rear surface 124 which extends outwardly and laterally from the piston shaft 120.

The piston shaft 120 is connected to a piston 125 which is slidably enclosed within a cylinder 126. Normally the piston is suitably biased toward the rear of the cylinder by biasing means, such as a spring 128, so that the probe 118 is maintained in the position shown in FIG. 11. In this position, the rear surface 124 of the probe is spaced well behind the juncture line 48 between the neck 46 and the diverging section 24. With the probe positioned in this manner, some disruption in the fluid flow within the neck 46 will occur, but this disruption does not occur at a point which will cause the fluid jet issuing from the nozzle 26 to switch to a hollow conical form. Instead, fluid flows over the surface of the probe and down over the pointed apex 122 to form a circular drive fluid jet 130 which issues centrally from the nozzle opening 26.

The cylinder 126 is mounted upon a streamlined strut 132 which extends from the wall of the flow passage 18 and includes a portion of the bypass line 30 terminating at the outlet port 34. The outlet port is positioned behind the piston 125, so that when the valve 38 is opened in response to the speed sensing device 40, fluid will pass from the fluid passage 18 through the bypass line 30 and the valve 38 to a point in the chamber 126 behind the piston 125. This fluid forces the piston outwardly against the bias of the spring 128, so that the piston rod 120 moves the probe 118 to the position shown in FIG. 12.

Referring to FIG. 12, it will be noted that the rear surface 124 of the probe 118 has been moved into alignment with the juncture 48 between the neck 46 and the diverging section 24. Impingement of fluid from the neck 46 against the rear surface of the probe now causes the fluid to fan outwardly against the inner wall of the diverging section to form a hollow, cone-shaped flow indicated at 134.

This hollow flow, as previously indicated, does not provide sufficient driving power to the turbine wheel 12 so that the turbine wheel loses speed.

The valve 38 of FIG. 11 is a three-way valve which is connected to a drain line 116, and during normal speed operation of the turbine wheel 12, the valve prevents fluid flow from the fluid passage 18 through the bypass line 30 while permitting fluid to drain from the cylinder 126 into the drain line 116. When the valve 38 is open to fluid flow through the bypass line 30, the path from the cylinder 126 to the drain line 116 is blocked.

Figure 13:
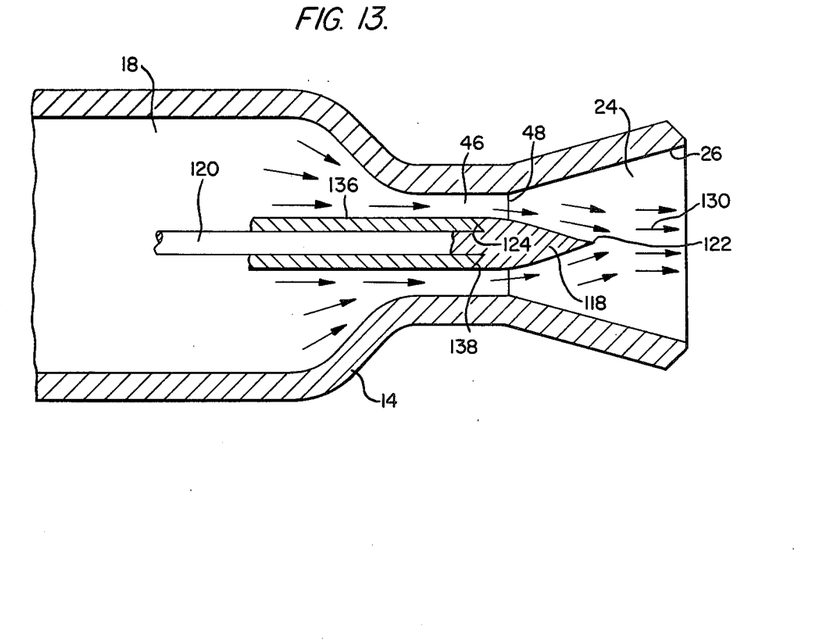
FIG. 13 is a vertical, longitudinal sectional view of a sixth embodiment of a nozzle of the present invention.
Figure 14:
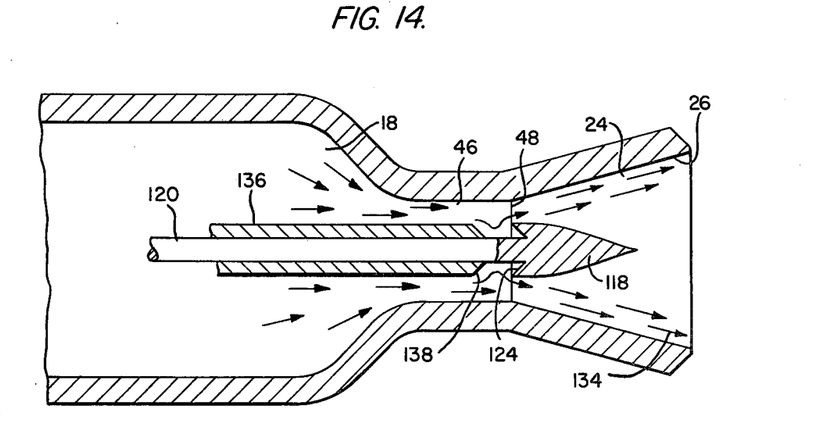
FIG. 14 is a vertical, longitudinal sectional view of a portion of the nozzle of FIG. 13 in the power off mode.

The normal fluid flow disruption through the nozzle 14 which is caused by the probe 118 of FIG. 11 may be substantially eliminated through the use of the structure illustrated in FIGS. 13 and 14. Here, the piston shaft 120 is encased in a fixed sleeve 136 which may be secured to the cylinder 126 or otherwise mounted within the flow passage 18. The end of the sleeve adjacent the probe 118 is structurally configured to mate with the rear surface 124 of the probe. As illustrated in FIGS. 13 and 14, both the end surface 138 of the sleeve 136 and the rear surface 124 of the probe 118 are preferably angled rearwardly.

The outer diameter of the sleeve 136 is equal to the outer diameter of the probe 118 at the peripheral edge of the rear wall 124 thereof, so that the probe tapers from a point flush with the outer wall of the sleeve down to the apex 122. Thus the probe causes no disruption of the fluid power jet 130 when the turbine wheel 12 is running at the desired speed. On the other hand, during an overspeed condition, the probe 118 is moved outwardly away from the sleeve 136 by the piston shaft 120 so that the peripheral edge of the rear wall 124 of the probe is now aligned with the juncture 48 between the neck 46 and the diverging section 24. Now the fluid through the neck strikes the rear wall of the probe 118 and fans outwardly against the inclined wall of the diverging section to provide the hollow cone-shaped flow 134.

The various diverter structures for the nozzle 14 described herein have been bi-stable structures to simply switch a fluid power jet between two modes; power on and power off. Obviously, however, the same structural concepts could be employed with a more sophisticated control valve and speed sensing device so that disruption of the fluid power jet is a function of the degree of control flow, which in turn is a function of turbine speed.

It should also be recognized that turbines are often arranged with two or more jets striking the same wheel, or with one or more jets striking two or more wheels. If multiple jets are employed, it is apparent that all jets will have to be controlled by devices of the type described. For example, if two jets are used, they can be simultaneously switched from a power on to a power off mode as the turbine reaches the desired maximum speed. However, improved control might be obtained if each jet is switched from a power on to a power off mode at different speed. Thus, both jets would produce full power at turbine speeds slightly below the desired speed, while only one jet would produce full power beginning at a turbine speed slightly below the desired speed and ending at a turbine speed slightly above the desired speed. At the point slightly above the desired speed, no power or torque would be produced. This arrangement will require appropriate modification of the speed sensing device 40, but would provide improved control and less frequent switching of the jets.

Finally, it will be recognized that the diverging section 24 described in connection with the various embodiments herein tends to cause the fluid leaving the necks 20 or 46 to act in accordance with the "Coanda Effect." Consequently, the fluid jet from the nozzle opening 26 may be easily diverted at points 22 and 48.

The diverging section 24 need not be in the form of a closed conical surface, but must include a surface which diverges away from the original axis of the water jet through the necks 20 or 46. For example, the surface of the diverging section 24 may include only a portion of a frustum of a cone.

INDUSTRIAL APPLICABILITY

The impulse turbine 10 may be operated and maintained at a controlled speed for electrical AC power generation or other applications where speed control is required. The direction of the driving fluid jet issuing from the nozzle opening 26 of the nozzle 14 may be effectively controlled with a very low control force and without the need for complex mechanical control devices. When the speed sensing device 40 senses an overspeed condition of the turbine wheel 12, the valve 38 or the solenoid coil 96 is activated thereby to cause disruption of the fluid flow through the neck 20 or the neck 46 at the juncture between the neck and the diverging section 24. Disruption of the flow at this point is accomplished by either a fluid jet or a simple flow diverter, and minimal energy is required to cause the fluid stream to flow along the inclined wall of the diverging section. The creation of a fluid flow along the diverging section wall results in a fluid jet from the nozzle opening 26 which either misses the turbine wheel 12 or does not provide an effective driving force thereto.

Other aspects, objects and advantages of this invention can be obtained from a study of the drawings, the disclosure and the appended claims.

I claim:

1. A fluid impulse turbine system (10) comprising:
 (a) a rotatably mounted turbine wheel means (12) rotated in response to a driving force from a jet driving fluid,
 (b) speed sensing means (40) connected to sense the speed of said turbine wheel means (12),
 (c) nozzle means (14) spaced from said turbine wheel means (12) and operative to selectively direct a jet of driving fluid from a nozzle opening (26) against said turbine wheel means (12), said nozzle means (14) including:
  (1) a neck section (20,46)
  (2) a diverging section (24) extending between said neck section (20,46) and said nozzle opening (26), said diverging section (24) tapering outwardly to said nozzle opening (26) from a juncture (22,48) with said neck section (20,46), and
 (d) fluid diverter means (30, 38, 74) mounted upon said nozzle means (14) and selectively operable to divert a flow of fluid from said neck section (20,46) outwardly at an angle to the common central axis of said neck section (20,46) and diverging section (24) to reduce the driving force applied by the jet of driving fluid from said nozzle opening (26) on the turbine wheel means (12), said fluid diverter means (30, 38, 74) acting to divert the flow of fluid from said neck section (20,46) at a location substantially aligned with the juncture (22,48) between said neck section (20,46) and said diverging section (24) by providing a flow of control fluid transverse to the flow of fluid from said neck section (20,46),
 (e) said speed sensing means (40) operating to cause said fluid diverter means (30, 38, 74) to divert the flow of fluid from said neck section (20, 46) outwardly when the speed of said turbine wheel means (12) exceeds a desired speed.

2. The fluid impulse turbine system (10) of claim 1 wherein the central longitudinal axis of said neck (20,46) and diverging section (24) extends through the periphery of said turbine wheel means (12), said diverging section (24) being tapered outwardly at an angle sufficient to permit the driving fluid from said nozzle opening (26) to pass outwardly beyond the periphery of said turbine wheel means (12) upon the diversion of the flow of fluid from said neck section (20,46) by the flow diverter means (30,38, 74).

3. The fluid impulse turbine system (10) of claim 2 wherein said diverging section (24) is tapered outwardly to form an angle within the range of from 20 to 40 degrees.

4. The fluid impulse turbine system (10) of claim 1 wherein said neck section (20, 46) is connected to a fluid passage (18) having a greater cross sectional area than the cross sectional area of said neck section (20, 46).

5. The fluid impulse turbine system (10) of claim 1 wherein said neck section (46) is of circular cross section to provide a circular fluid stream from said neck section (46).

6. The fluid impulse turbine system (10) of claim 1 wherein said neck section (46) is of circular cross section, said fluid diverter means (30, 38 74) operating to disrupt the central portion of the flow of fluid from said neck section (46) to cause said fluid to flow outwardly along the periphery of said diverging section (24).

7. The fluid impulse turbine system of claim 1 wherein said fluid diverter means (30, 38, 74) includes fluid bypass means (30) to conduct a control fluid flow from the fluid flowing through said nozzle means (14), and actuator means (38) operative to permit or block the flow of control fluid through said fluid bypass means (30), said actuator means (38) being controlled by said speed sensing means (40).

8. The fluid impulse turbine system (10) of claim 1 wherein said fluid diverter means (30, 38, 74) includes an elongated tube (74) mounted within said nozzle (14) and axially aligned with the longitudinal axis of said neck section (46) and diverging section (24), the ends (78,80) of said tube (74) being closed, said tube being provided with peripherally arranged fluid outlet means (84) intermediate the ends (78,80) thereof, and control fluid supply means (30, 38) to selectively supply control fluid to the interior of said tube (74).

9. The fluid impulse system (10) of claim 8 wherein said peripherally arranged fluid outlet means (84) are substantially aligned with the juncture (48) between said neck section (46) and said diverging section (24).

10. The fluid impulse system (10) of claim 9 wherein said neck section (46) is circular in cross section, said control fluid supply means (30, 38) including a fluid bypass line (30) connected to conduct fluid flowing through said nozzle (14) to the interior of said tube (74), and actuator means (38) to selectively permit or block fluid flow through said bypass line (30).

11. The fluid impulse system (10) of claim 5 wherein said fluid diverter means (30,38,74) includes an arcuately arranged fluid outlet means located at the juncture (22,48) between said neck section (20,46) and said diverging section (24) to provide said flow of control fluid.

* * * * *